United States Patent
Noh et al.

(10) Patent No.: US 12,269,537 B2
(45) Date of Patent: Apr. 8, 2025

(54) VEHICLE STRUCTURE

(71) Applicants: Hyundai Motor Company, Seoul (KR); Kia Corporation, Seoul (KR)

(72) Inventors: Seung Ho Noh, Anyang-si (KR); Seung Min Jeong, Hwaseong-si (KR)

(73) Assignees: Hyundai Motor Company (KR); Kia Corporation (KR)

( * ) Notice: Subject to any disclaimer, the term of this patent is extended or adjusted under 35 U.S.C. 154(b) by 425 days.

(21) Appl. No.: 17/891,642

(22) Filed: Aug. 19, 2022

(65) Prior Publication Data
US 2023/0331307 A1    Oct. 19, 2023

(30) Foreign Application Priority Data

Apr. 15, 2022 (KR) .......... 10-2022-0046756

(51) Int. Cl.
| | |
|---|---|
| B62D 25/08 | (2006.01) |
| B60R 19/18 | (2006.01) |
| B62D 21/15 | (2006.01) |
| B62D 25/16 | (2006.01) |

(52) U.S. Cl.
CPC ......... B62D 25/082 (2013.01); B62D 25/085 (2013.01); B60R 19/18 (2013.01); B62D 21/152 (2013.01); B62D 25/16 (2013.01)

(58) Field of Classification Search
CPC ... B62D 25/085; B62D 21/152; B62D 25/082
USPC ............... 296/187.09, 187.1, 193.09, 203.02
See application file for complete search history.

(56) References Cited

U.S. PATENT DOCUMENTS

| | | | | |
|---|---|---|---|---|
| 6,109,654 A | * | 8/2000 | Yamamoto | B62D 21/11 280/124.109 |
| 7,832,795 B2 | * | 11/2010 | Yokoi | B62D 25/2018 296/203.02 |
| 8,075,047 B2 | * | 12/2011 | Yamada | B62D 25/04 296/30 |
| 8,480,102 B2 | * | 7/2013 | Yamada | B62D 21/155 180/311 |
| 8,720,983 B1 | * | 5/2014 | Edwards | B62D 21/152 296/203.02 |
| 8,833,838 B2 | * | 9/2014 | Watanabe | B62D 21/152 296/203.02 |

(Continued)

FOREIGN PATENT DOCUMENTS

| | | |
|---|---|---|
| JP | 2000177636 | 6/2000 |
| KR | 1020140024661 | 3/2014 |

(Continued)

Primary Examiner — Jason S Morrow
(74) Attorney, Agent, or Firm — Fish & Richardson P.C.

(57) ABSTRACT

A vehicle structure includes a plurality of front side bars that extend toward a front of a vehicle and are spaced apart from each other and arranged at sides of the vehicle with respect to a center of the vehicle, and a front cross bar that extends in a transverse direction of the vehicle and connects front ends of the plurality of front side bars to each other. The vehicle structure further includes a plurality of fender apron bars, where each of the plurality of fender apron bars extends from a coupling portion between the front cross bar and one of the plurality of front side bars in the transverse direction and in a direction rearward and upward relative to the front cross bar.

15 Claims, 10 Drawing Sheets

(56) References Cited

U.S. PATENT DOCUMENTS

| | | | |
|---|---|---|---|
| 8,882,184 B2* | 11/2014 | Naito | B62D 25/082 |
| | | | 296/203.02 |
| 9,126,633 B2* | 9/2015 | Cho | B62D 25/082 |
| 9,242,675 B2* | 1/2016 | Kuriyama | B62D 21/152 |
| 9,381,952 B2* | 7/2016 | Furusaki | B62D 25/2018 |
| 9,545,950 B2* | 1/2017 | Lee | B62D 21/152 |
| 9,573,628 B2* | 2/2017 | Mildner | B62D 27/023 |
| 9,586,624 B2* | 3/2017 | Riedl | B62D 25/082 |
| 10,526,016 B2* | 1/2020 | Takii | B62D 21/02 |
| 10,589,790 B2* | 3/2020 | Ayukawa | B62D 21/152 |
| 10,597,084 B2* | 3/2020 | Ayukawa | B62D 21/157 |
| 11,001,308 B2* | 5/2021 | Atsumi | B62D 21/152 |
| 11,124,237 B2* | 9/2021 | Heo | B62D 21/152 |
| 11,173,966 B2* | 11/2021 | Xiao | B62D 27/023 |
| 11,180,194 B2* | 11/2021 | Wang | B62D 25/2045 |
| 11,305,818 B2* | 4/2022 | Yashiro | B62D 24/02 |
| 11,313,705 B2* | 4/2022 | Kato | G01S 13/931 |
| 11,724,587 B2* | 8/2023 | Gim | B60R 19/023 |
| | | | 165/47 |
| 11,939,001 B2* | 3/2024 | Li | B62D 27/065 |
| 12,139,002 B2* | 11/2024 | Kondo | B60R 16/04 |
| 2016/0046326 A1 | 2/2016 | Jung et al. | |
| 2017/0021867 A1 | 1/2017 | Lee et al. | |
| 2023/0202577 A1* | 6/2023 | Kang | B62D 21/152 |
| 2024/0158019 A1* | 5/2024 | Kang | B62D 27/023 |

FOREIGN PATENT DOCUMENTS

| | | |
|---|---|---|
| KR | 101448788 | 10/2014 |
| KR | 101575335 | 12/2015 |
| KR | 101704039 | 2/2017 |
| KR | 1020200061153 | 6/2020 |
| KR | 1020210130883 | 11/2021 |

* cited by examiner

VEHICLE STRUCTURE

CROSS-REFERENCE TO RELATED APPLICATION(S)

This application is based on and claims priority under 35 U.S.C. 119 to Korean Patent Application No. 10-2022-0046756, filed on Apr. 15, 2022, in the Korean Intellectual Property Office, the disclosure of which is herein incorporated by reference in its entirety.

TECHNICAL FIELD

The present disclosure relates to a technology regarding a vehicle structure.

BACKGROUND

A purpose built vehicle (PBV) refers to a vehicle including a drive module that relates to vehicle driving and a life module that defines various types of boarding and loading spaces according to market demands and market trends towards multi-type small-amount production.

For example, the life module may be configured such that the vehicle is appropriate for a specific purpose according to market demands.

In some cases, simply by changing the life module, a vehicle may be quickly produced according to market demands.

Furthermore, in line with recent trends towards eco-friendly vehicle technologies, the drive module may include a high-voltage battery mounted on a frame.

Therefore, a PBV may be configured by coupling a vehicle having a type conforming to the vehicle purpose to a frame equipped with a high-voltage battery.

In some cases, PBVs may have a front overhang formed very short to enhance indoor product merits of the life module and to have a passenger space disposed to the front of the vehicle. In some cases, a space for absorbing collision energy during a front collision of the vehicle may be reduced, thereby making it difficult to secure collision safety.

SUMMARY

The present disclosure describes a vehicle structure configured such that sufficient rigidity can be secured against vehicle front collisions in the case of a vehicle such as a PBV, thereby securing safety of the vehicle, and torsional rigidity of the vehicle can be secured, thereby improving durability of the vehicle.

According to one aspect of the subject matter described in this application, a vehicle structure includes a plurality of front side bars that extend toward a front of a vehicle, where the plurality of front side bars are spaced apart from each other and arranged at sides of the vehicle with respect to a center of the vehicle. The vehicle structure further includes a front cross bar that extends in a transverse direction of the vehicle and connects front ends of the plurality of front side bars to each other, and a plurality of fender apron bars, where each of the plurality of fender apron bars extends from a coupling portion between the front cross bar and one of the plurality of front side bars in the transverse direction and in a direction rearward and upward relative to the front cross bar.

Implementations according to this aspect can include one or more of the following features. For example, the vehicle structure can further include a dash panel and a dash floor that are connected to each other to thereby define a connection part therebetween, where each of the plurality of front side bars is coupled to a front side of the connection part between the dash panel and the dash floor. In some examples, the vehicle structure can further include a dash cross bar that is coupled to a rear side of the connection part between the dash panel and the dash floor.

In some implementations, the vehicle structure can further include a fender apron that is coupled to a rear end of one of the plurality of fender apron bars. In some implementations, the vehicle structure can further include a frame disposed below the plurality of front side bars, and a mounting bolt that protrudes downward relative to the plurality of front side bars and couples the frame to one of the front ends of the plurality of front side bars. In some examples, front projections of the front cross bar, the plurality of front side bars, and the frame can define a closed curve.

In some implementations, the frame can include a plurality of frame side bars that extend in a front-rear direction of the vehicle, where the mounting bolt is coupled to one of the plurality of frame side bars. The frame can further include a plurality of vertical bars that extend downward relative to the plurality of frame side bars, where each of the plurality of vertical bars extends downward from one of the plurality of frame side bars, a plurality of frame lower side bars that are disposed below the plurality of frame side bars and extend in the front-rear direction of the vehicle, and a frame cross bar that extends in the transverse direction of the vehicle and connects the plurality of frame lower side bars to each other.

In some examples, the vehicle structure can further include a bumper back beam that is disposed at the front of the vehicle and connected to front ends of the plurality of frame side bars, where the bumper back beam extends in the transverse direction of the vehicle. In some implementations, the front cross bar can include an upper plate and a lower plate that are flange-coupled to each other and define a closed cross-section. In some implementations, the vehicle structure can include a front-end bracket disposed at the front ends of the plurality of front side bars and coupled to the front cross bar, where the upper plate of the front cross bar is coupled to (i) a rear surface of the front-end bracket, (ii) upper surfaces of the plurality of front side bars, and (iii) side surfaces of the plurality of front side bars.

In some implementations, the lower plate of the front cross bar can be coupled to the side surfaces of the plurality of front side bars and to the rear surface of the front-end bracket. In some examples, the lower plate can have a front part that is bent downward and flange-coupled to a lower end of the upper plate, and a rear part that is bent upward and then bent rearward and that is flange-coupled to a rear part of the upper plate, where the rear part of the upper plate is bent downward and then bent rearward to be flange-coupled to the rear part of the lower plate.

In some implementations, one of the front ends of the plurality of front side bars can be connected to a first lateral end of the front cross bar, and another of the front ends of the plurality of front side bars can be connected to a second lateral end of the front cross bar. In some examples, the plurality of fender apron bars can include a first fender apron bar that is connected to the first lateral end of the front cross bar and that extends rearward and away from the first lateral end of the front cross bar, and a second fender apron bar that is connected to the second lateral end of the front cross bar and that extends rearward and away from the second lateral end of the front cross bar.

In some implementations, the plurality of front side bars include a first front side bar disposed at a first side of the center of the vehicle, and a second front side bar disposed at a second side opposite to the first side with respect to the center of the vehicle. In some examples, the first front side bar can be connected to a first lateral end of the front cross bar, and the second front side bar can be connected to a second lateral end of the front cross bar.

According to another aspect, a vehicle structure includes a plurality of front side members that extend toward a front of a vehicle, where the plurality of front side members are spaced apart from each other and arranged at sides of the vehicle with respect to a center of the vehicle. The vehicle structure further includes a front cross member that extends in a transverse direction of the vehicle and connects front ends of the plurality of front side members to each other, and a plurality of fender apron members, where each of the plurality of fender apron members extends from a coupling portion between the front cross member and one of the plurality of front side members in the transverse direction and in a direction rearward and upward relative to the front cross member.

Implementations according to this aspect can include one or more of the following features. For example, each of the plurality of front side members, the front cross member, each of the plurality of fender apron members include at least one of a bar, a plate, or a beam. In some implementations, the front cross member can include an upper plate and a lower plate that are coupled to each other and define a space therebetween.

According to the present disclosure, sufficient rigidity can be secured against vehicle front collisions in the case of a vehicle such as a PBV, thereby securing safety of the vehicle, and torsional rigidity of the vehicle can be secured, thereby improving durability of the vehicle.

DETAILED DESCRIPTION

Figure 1:
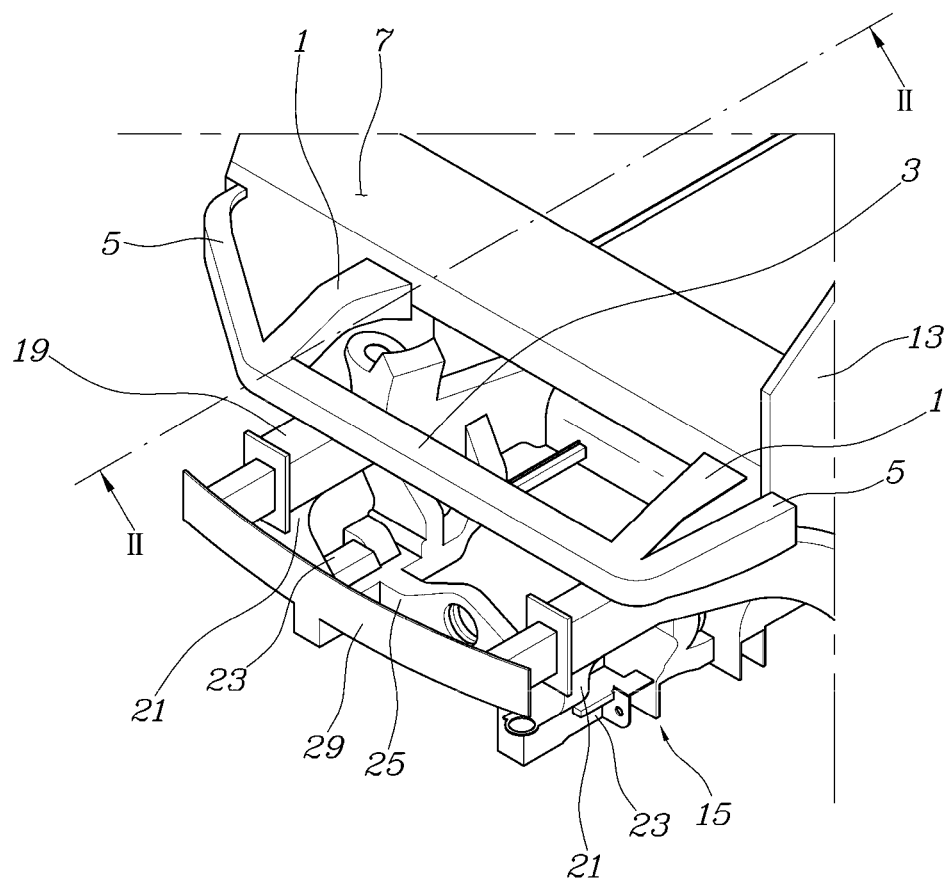
FIG. 1 is a view showing an example of a vehicle structure.

Hereinafter, exemplary implementations of the present disclosure will be described in detail with reference to the accompanying drawings. Similar or like reference signs presented in the respective drawings designate similar or like elements.

In some implementations, referring to FIG. 1 to FIG. 10, a vehicle structure can include: front side members 1 elongated toward the front of a vehicle and arranged at both sides with reference to the center of the vehicle to be spaced apart from each other; a front cross member 3 elongated in the transverse direction of the vehicle so as to connect front ends of the two front side members 1; and fender apron members 5 shaped to extend from coupling parts between the front side members 1 and the front cross member 3 to rear and transverse upper sides of the vehicle. In some implementations, the front side members 1, the front cross member 3, the fender apron members 5 can include or refer to mechanical elements such as bars, plates, beams, or the like.

In some implementations, the front side members 1 can be configured to mainly absorb impact force applied from the front of the vehicle, and the front cross member 3 and the fender apron members 5 can be configured to distribute and absorb the impact force, so as to provide strong support rigidity in the front/rear, the left/right, and the up/down direction of the vehicle with respect to impact force applied from the front of the vehicle.

The front side members 1 can be coupled to the front side of a connection part between a dash panel 7 and a dash floor 9.

Figure 2:
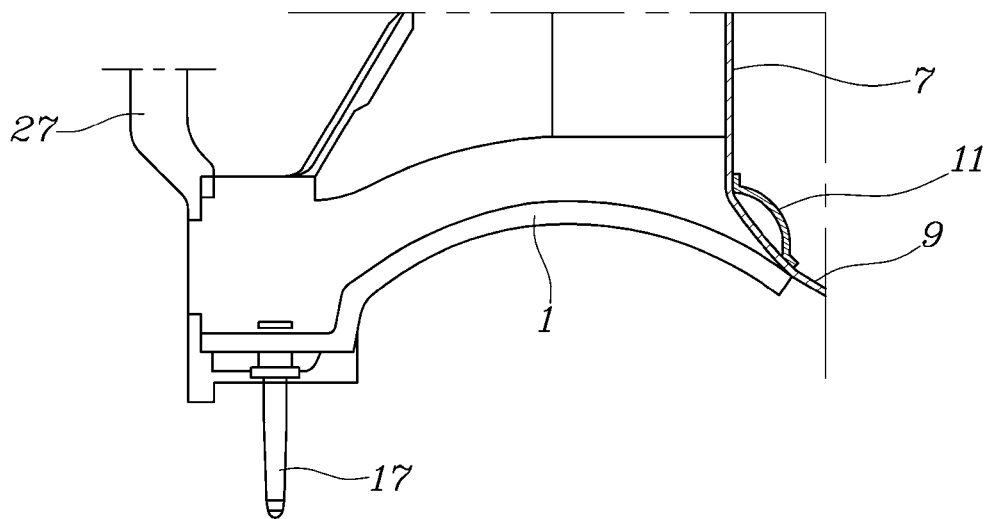
FIG. 2 is a cross-sectional view taken along the line II-II of FIG. 1.
Figure 3:
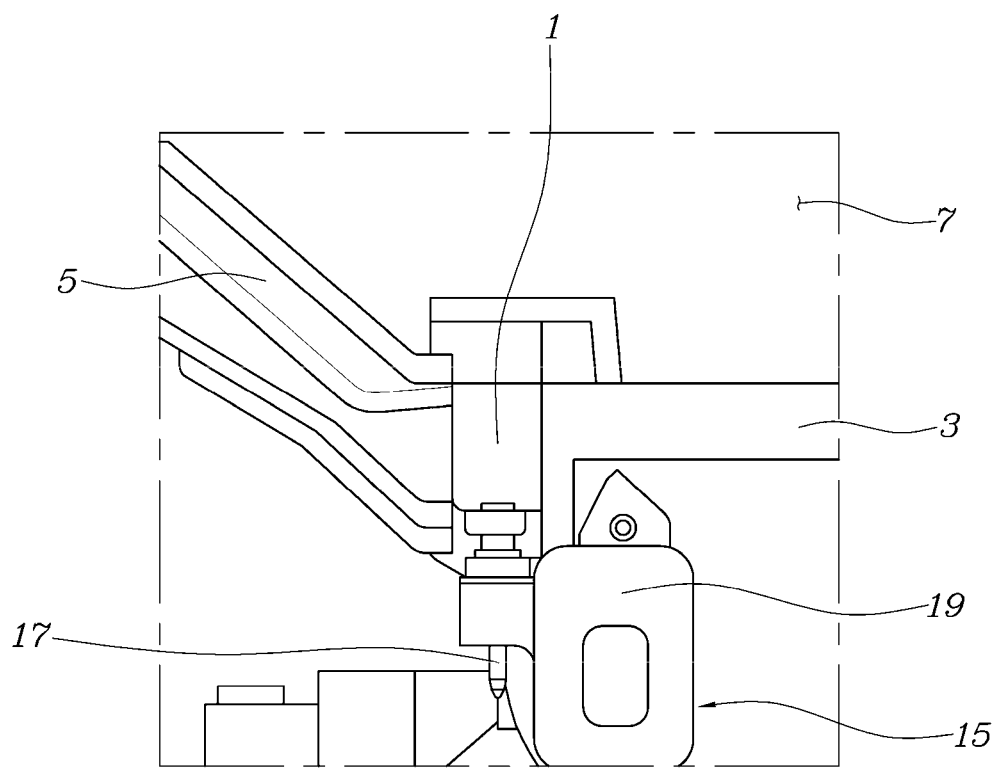
FIG. 3 is a detailed view showing an example of a front side member seen from the front side of the vehicle of FIG. 1.
Figure 4:
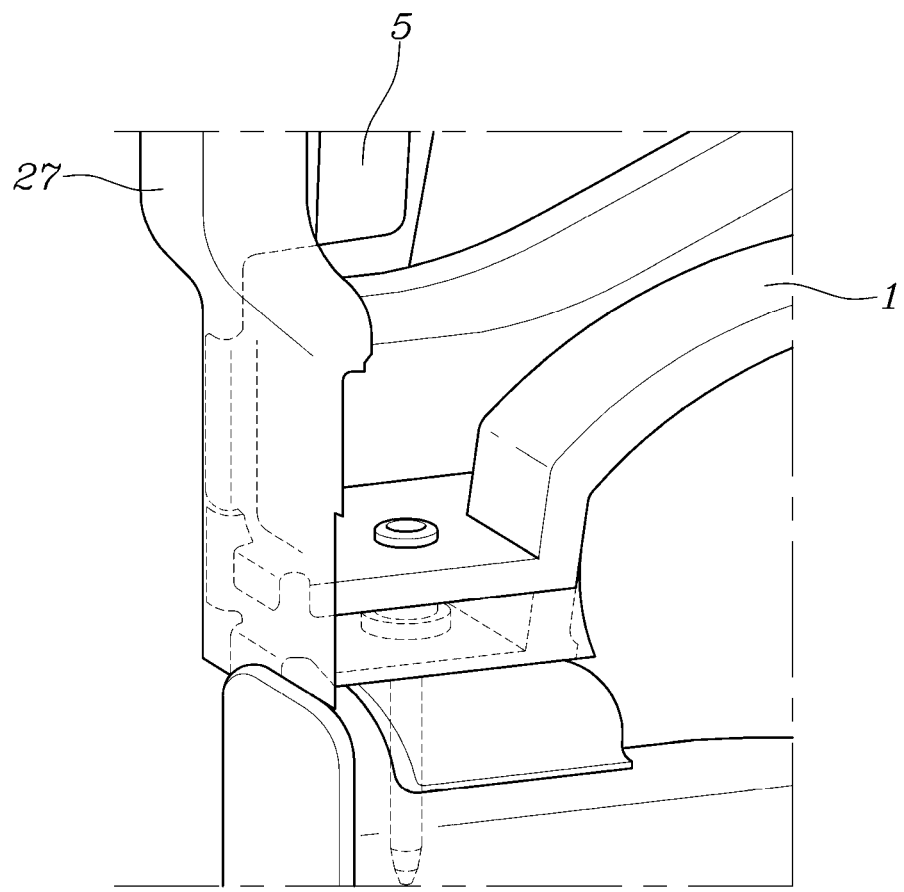
FIG. 4 is a view illustrating an example of a mounting bolt coupled to the front side member of FIG. 1.
Figure 5:
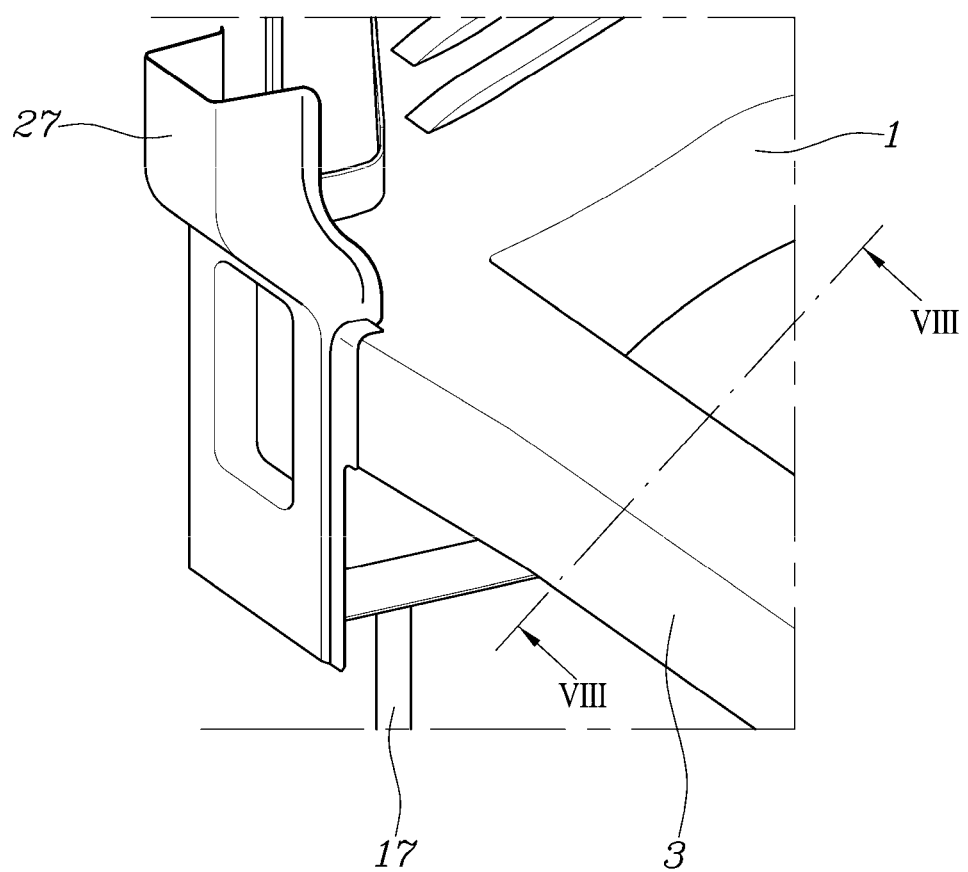
FIG. 5 is a detailed view of the front portion of the front side member of FIG. 1.
Figure 6:
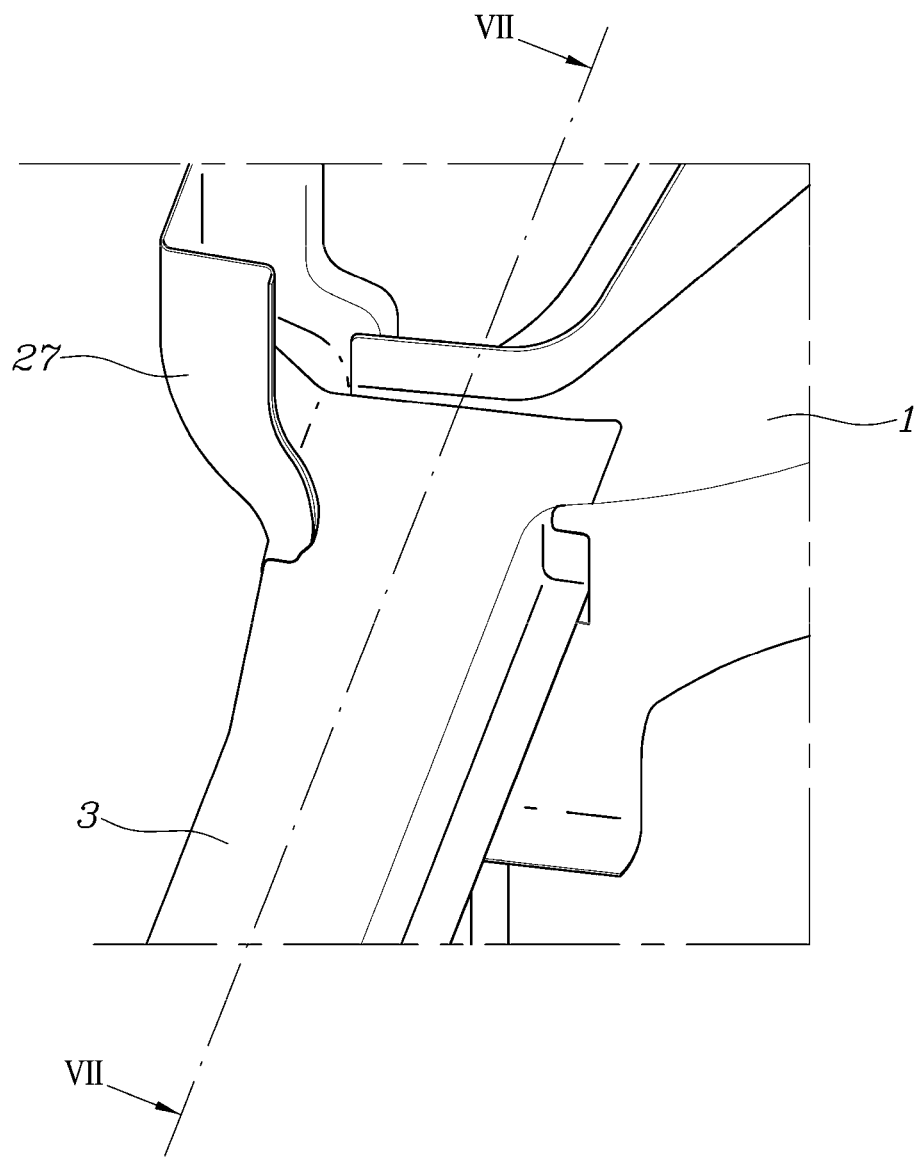
FIG. 6 is a view seen from the rear side of FIG. 5.
Figure 7:
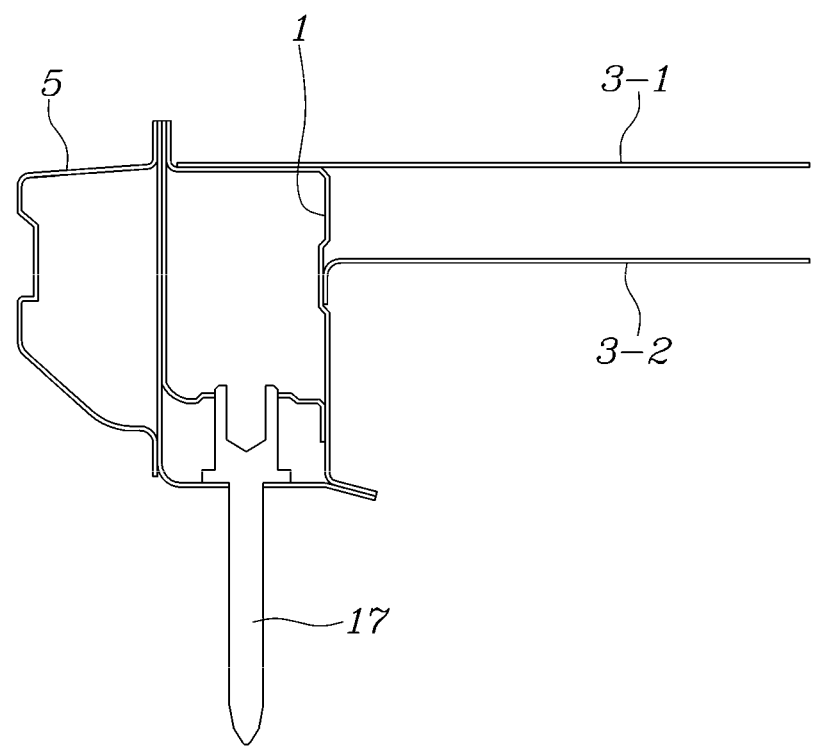
FIG. 7 is a cross-sectional view taken along the line VII-VII of FIG. 6.
Figure 8:
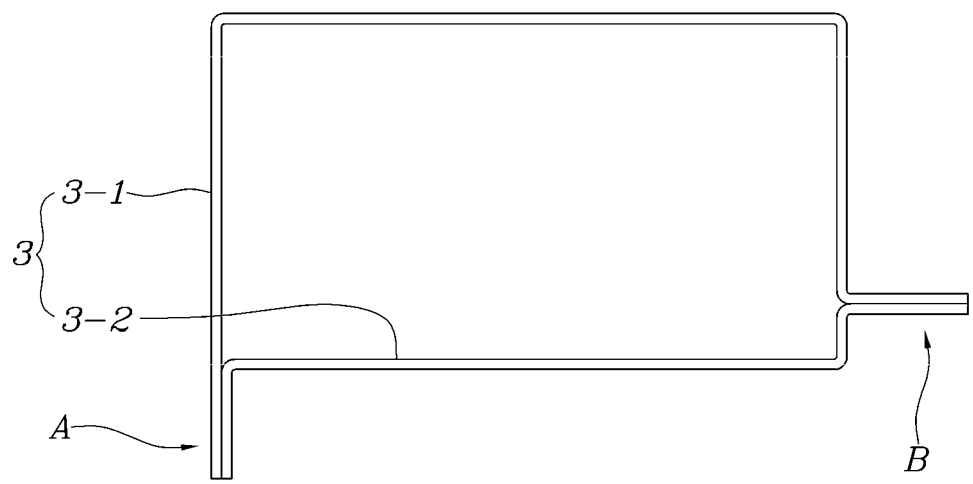
FIG. 8 is a cross-sectional view taken along the line VIII-VIII of FIG. 5.

For example, as illustrated in FIG. 2, the dash panel 7 and the dash floor 9 can be formed from one panel in which the dash panel 7 and the dash floor 9 are connected to each other and bent. In some examples, the dash panel 7 and the dash floor 9 can be formed from two different panels that are coupled to each other at a bent portion thereof.

In some implementations, a dash cross member 11 can be coupled to the rear side of the connection part between the dash panel 7 and the dash floor 9.

Therefore, the dash cross member 11 can make it possible that the portions, to which the rear ends of the front side members 1 are coupled, are configured to have more strong rigidity.

In some examples, the rear end of the fender apron members 5 can be coupled to a fender apron 13.

Accordingly, the impact force applied from the front of the front side members 1 can be delivered to the dash panel 7 and the dash floor 9 through the front side members 1, and then can be distributed and delivered to the fender apron 13 through the fender apron members 5.

Here, the front side members 1, the front cross member 3, the fender apron members 5, the dash panel 7, the dash floor 9, and the like can constitute a vehicle body to be a life module of a purpose-built vehicle (PBV).

A mounting bolt 17 for coupling a frame 15 can be installed at the front ends of the front side members 1 so as to protrude downward.

Accordingly, the frame 15 can be directly coupled to the lower sides of the front side members 1 by the mounting bolt 17.

Figure 9:
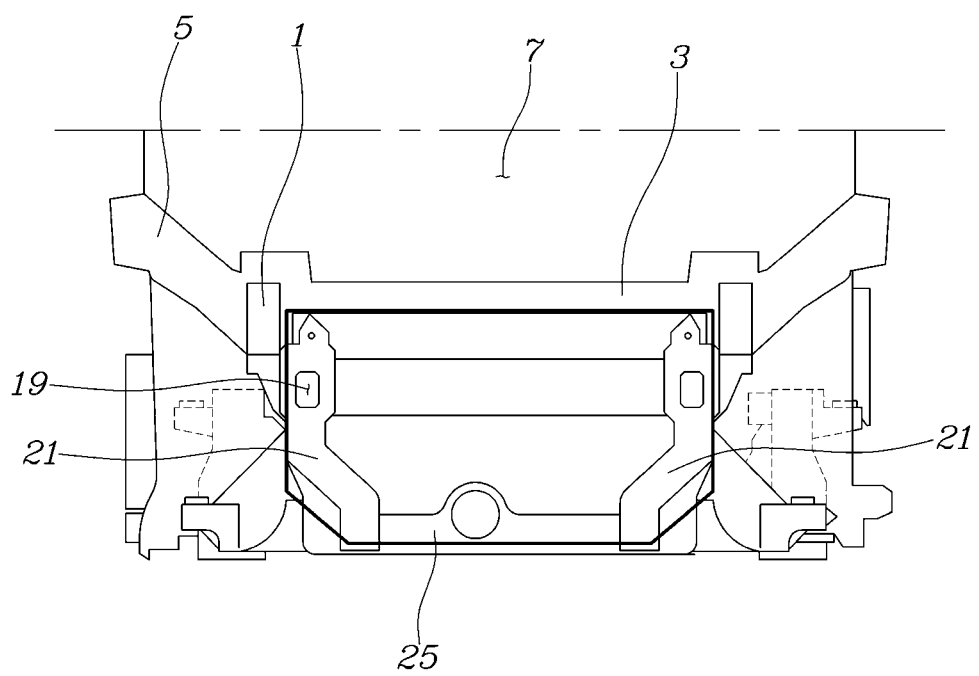
FIG. 9 is a view seen from the front side of the vehicle of FIG. 1.

As described above, when the frame 15 is coupled to the lower sides of the front side members 1 by the mounting bolt 17, the front projection of the front cross member 3, the front side members 1, and the frame 15 can form a closed curve as illustrated in FIG. 9.

In some implementations, the frame 15 can include: frame side members 19 to which the mounting bolt 17 is coupled and which is arranged to elongate in the front/rear direction of the vehicle; vertical members 21 configured to extend downward from the frame side members 19; frame lower side members 23 arranged at the lower parts of the frame side members 19 to elongate in the front/rear direction of the vehicle; and a frame cross member 25 disposed to elongate in the transverse direction of the vehicle so as to connect the two frame lower side members 23.

Therefore, the front side members 1 and the front cross member 3 constituting the vehicle body, and the frame side members 19, the vertical members 21, the frame lower side members 23, and the frame cross member 25 constituting the frame 15, can form a closed curve as illustrated in FIG. 9, thereby sufficiently securing torsional rigidity of the vehicle and thus greatly improving durability and noise vibration and harshness (NVH) performance of the vehicle.

For example, the frame 15 can have a battery and a motor, which are further mounted thereto, to be a drive module of a PBV.

In some implementations, the front cross member 3 can have an upper member 3-1 and a lower member 3-2 which are flange-coupled to form a closed section. For examples, each of the upper member 3-1 and the lower member 3-2 can include a plate.

That is, the case of the upper member 3-1 and the lower member 3-2 of the front cross member 3, the lower member 3-2 can have a front part which is bent downward to be flange-coupled to the lower end of the upper member 3-1 and thus to form a front flange A; the lower member 3-2 can have a rear part which is bent upward and then bent backward to be flange-coupled to the rear part of the upper member 3-1 and thus to form a rear flange B; and the upper member 3-1 can have a rear part which is bent downward and then bent backward to form the rear flange B together with the rear part of the lower member 3-2.

In some implementations, a front-end bracket 27 can be mounted to the front ends of the front side members 1; and the upper member 3-1 of the front cross member 3 can be coupled to the upper surfaces and the side surfaces of the front side members 1 and the rear surface of the front-end bracket 27.

In addition, the lower member 3-2 of the front cross member 3 can be coupled to the side surfaces of the front side members 1 and the rear surface of the front-end bracket 27.

Accordingly, the front cross member 3 can be configured to secure strong rigidity by itself, and can be configured to secure strong assembly rigidity with respect to the front side members 1 and the front-end bracket 27.

Figure 10:
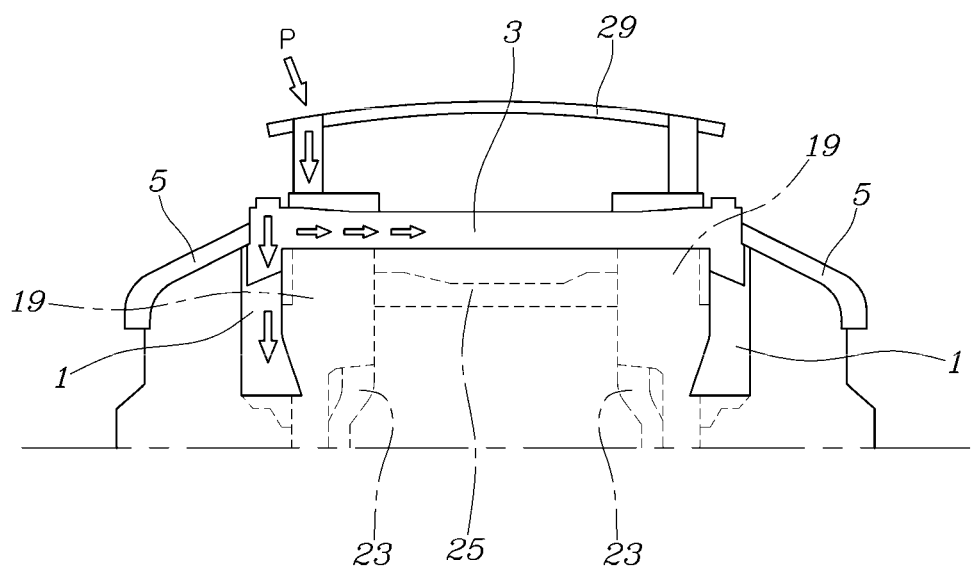
FIG. 10 is a view seen from the upper side of the vehicle of FIG. 1.

In some implementations, when an impact force P is applied in an inclined direction from the front side of the vehicle through a bumper back beam 29 installed in front of the frame side members 19 of the frame, the impact force P can be delivered from the frame 15 and then can be distributed through the front side members 1 and the front cross member 3. For instance, FIG. 10 shows the delivery and distribution of the impact force. Therefore, the present disclosure provides an effect associated with the regulation of the Oblique Moving Deformable Barrier (OMDB).

Although the present disclosure has been described and illustrated in conjunction with particular implementations thereof, it will be apparent to those skilled in the art that various improvements and modifications can be made to the present disclosure without departing from the technical idea of the present disclosure defined by the appended claims.

What is claimed is:

1. A vehicle structure comprising:
a plurality of front side bars that extend toward a front of a vehicle, the plurality of front side bars being spaced apart from each other and arranged at sides of the vehicle with respect to a center of the vehicle;
a front cross bar that extends in a transverse direction of the vehicle and connects front ends of the plurality of front side bars to each other;
a plurality of fender apron bars, each of the plurality of fender apron bars extending from a coupling portion between the front cross bar and one of the plurality of front side bars in the transverse direction and in a direction rearward and upward relative to the front cross bar;
a frame disposed below the plurality of front side bars; and
a mounting bolt that protrudes downward relative to the plurality of front side bars and couples the frame to one of the front ends of the plurality of front side bars,
wherein front projections of the front cross bar, the plurality of front side bars, and the frame define a closed curve, and
wherein the frame comprises:
a plurality of frame side bars that extend in a front-rear direction of the vehicle, the mounting bolt being coupled to one of the plurality of frame side bars,
a plurality of vertical bars that extend downward relative to the plurality of frame side bars, each of the plurality of vertical bars extending downward from one of the plurality of frame side bars,
a plurality of frame lower side bars that are disposed below the plurality of frame side bars and extend in the front-rear direction of the vehicle, and
a frame cross bar that extends in the transverse direction of the vehicle and connects the plurality of frame lower side bars to each other.

2. The vehicle structure of claim 1, further comprising a dash panel and a dash floor that are connected to each other to thereby define a connection part therebetween, each of the plurality of front side bars being coupled to a front side of the connection part between the dash panel and the dash floor.

3. The vehicle structure of claim 2, further comprising a dash cross bar that is coupled to a rear side of the connection part between the dash panel and the dash floor.

4. The vehicle structure of claim 1, further comprising a fender apron that is coupled to a rear end of one of the plurality of fender apron bars.

5. The vehicle structure of claim 1, further comprising a bumper back beam that is disposed at the front of the vehicle and connected to front ends of the plurality of frame side bars, the bumper back beam extending in the transverse direction of the vehicle.

6. The vehicle structure of claim 1, wherein the front cross bar comprises an upper plate and a lower plate that are flange-coupled to each other and define a closed cross-section.

7. A vehicle structure comprising:
a plurality of front side bars that extend toward a front of a vehicle, the plurality of front side bars being spaced apart from each other and arranged at sides of the vehicle with respect to a center of the vehicle;
a front cross bar that extends in a transverse direction of the vehicle and connects front ends of the plurality of front side bars to each other;
a plurality of fender apron bars, each of the plurality of fender apron bars extending from a coupling portion between the front cross bar and one of the plurality of front side bars in the transverse direction and in a direction rearward and upward relative to the front cross bar; and a front-end bracket disposed at the front ends of the plurality of front side bars and coupled to the front cross bar, wherein the front cross bar comprises an upper plate and a lower plate that are flange-coupled to each other and define a closed cross-section, and wherein the upper plate of the front cross bar is coupled to (i) a rear surface of the front-end bracket, (ii) upper surfaces of the plurality of front side bars, and (iii) side surfaces of the plurality of front side bars.

8. The vehicle structure of claim 7, wherein the lower plate of the front cross bar is coupled to the side surfaces of the plurality of front side bars and to the rear surface of the front-end bracket.

9. The vehicle structure of claim 7, wherein the lower plate has:
   a front part that is bent downward and flange-coupled to a lower end of the upper plate; and
   a rear part that is bent upward and then bent rearward and that is flange-coupled to a rear part of the upper plate, the rear part of the upper plate being bent downward and then bent rearward to be flange-coupled to the rear part of the lower plate.

10. The vehicle structure of claim 1, wherein one of the front ends of the plurality of front side bars is connected to a first lateral end of the front cross bar, and
   wherein another of the front ends of the plurality of front side bars is connected to a second lateral end of the front cross bar.

11. The vehicle structure of claim 10, wherein the plurality of fender apron bars comprise:
   a first fender apron bar that is connected to the first lateral end of the front cross bar, and the first fender apron bar extending rearward and away from the first lateral end of the front cross bar; and
   a second fender apron bar that is connected to the second lateral end of the front cross bar, the second fender apron bar extending rearward and away from the second lateral end of the front cross bar.

12. The vehicle structure of claim 1, wherein the plurality of front side bars include:
   a first front side bar disposed at a first side of the center of the vehicle; and
   a second front side bar disposed at a second side opposite to the first side with respect to the center of the vehicle.

13. The vehicle structure of claim 12, wherein the first front side bar is connected to a first lateral end of the front cross bar, and
   wherein the second front side bar is connected to a second lateral end of the front cross bar.

14. The vehicle structure of claim 13, wherein the plurality of fender apron bars comprise:
   a first fender apron bar that is connected to the first lateral end of the front cross bar, and the first fender apron bar extending rearward and away from the first lateral end of the front cross bar; and
   a second fender apron bar that is connected to the second lateral end of the front cross bar, the second fender apron bar extending rearward and away from the second lateral end of the front cross bar.

15. A vehicle structure comprising:
   a plurality of front side bars that extend toward a front of a vehicle, the plurality of front side bars being spaced apart from each other and arranged at sides of the vehicle with respect to a center of the vehicle;
   a front cross bar that extends in a transverse direction of the vehicle and connects front ends of the plurality of front side bars to each other; and
   a plurality of fender apron bars, each of the plurality of fender apron bars extending from a coupling portion between the front cross bar and one of the plurality of front side bars in the transverse direction and in a direction rearward and upward relative to the front cross bar,
   wherein the front cross bar comprises an upper plate and a lower plate that are flange-coupled to each other and define a closed cross-section, and
   wherein the lower plate has:
      a front part that is bent downward and flange-coupled to a lower end of the upper plate, and
      a rear part that is bent upward and then bent rearward and that is flange-coupled to a rear part of the upper plate, the rear part of the upper plate being bent downward and then bent rearward to be flange-coupled to the rear part of the lower plate.

* * * * *